United States Patent
Tomita

(10) Patent No.: US 8,846,256 B2
(45) Date of Patent: Sep. 30, 2014

(54) SELECTIVELY OXYGEN-PERMEABLE SUBSTRATE, METAL-AIR BATTERY POSITIVE ELECTRODE AND METAL-AIR BATTERY

(75) Inventor: Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/551,751

(22) Filed: Jul. 18, 2012

(65) Prior Publication Data

US 2013/0059213 A1    Mar. 7, 2013

Related U.S. Application Data

(60) Provisional application No. 61/552,681, filed on Oct. 28, 2011.

(30) Foreign Application Priority Data

Sep. 5, 2011   (JP) .................................. 2011-192651
Jun. 7, 2012   (JP) .................................. 2012-129657

(51) Int. Cl.
| | | |
|---|---|---|
| *H01M 8/22* | (2006.01) | |
| *H01M 4/86* | (2006.01) | |
| *H01M 8/02* | (2006.01) | |
| *H01M 12/06* | (2006.01) | |

(52) U.S. Cl.
CPC ............ *H01M 4/8605* (2013.01); *Y02E 60/128* (2013.01); *H01M 8/0243* (2013.01); *H01M 8/0234* (2013.01); *Y02E 60/50* (2013.01); *H01M 8/0245* (2013.01); *H01M 12/06* (2013.01)
USPC ........ 429/405; 428/304.4; 252/502; 252/503; 252/506

(58) Field of Classification Search
CPC ....... H01M 4/583; H01M 8/22; H01M 12/08; H01M 4/86; B32B 5/18; H02J 7/00
USPC .......................................... 252/502, 503, 506
See application file for complete search history.

(56) References Cited

U.S. PATENT DOCUMENTS

| | | | |
|---|---|---|---|
| 2012/0040254 A1* | 2/2012 | Amendola et al. | ............ 429/406 |
| 2012/0178002 A1* | 7/2012 | Garsuch et al. | ............... 429/405 |
| 2013/0011739 A1* | 1/2013 | Gauthier et al. | ............... 429/221 |

FOREIGN PATENT DOCUMENTS

| | | | |
|---|---|---|---|
| JP | 10-099629 A1 | | 4/1998 |
| JP | 2001313093 A | * | 11/2001 |
| JP | 2007-237138 A1 | | 9/2007 |

OTHER PUBLICATIONS

U.S. Appl. No. 13/542,059, filed Jul. 5, 2012, Kenichi Noda.

* cited by examiner

*Primary Examiner* — Douglas Mc Ginty
(74) *Attorney, Agent, or Firm* — Burr & Brown, PLLC

(57) ABSTRACT

A selectively oxygen-permeable substrate has a magnetic material dispersion layer having carbon as the main component and a magnetic material dispersed therein. The magnetic material dispersion layer has a gas introduction face for introducing gas into the inside thereof, and the magnetic material dispersion layer is preferably a layer where a magnetic material is dispersed in a porous carbon membrane and can be used as a substrate for a metal-air battery positive electrode. More preferably, the selectively oxygen-permeable substrate has the magnetic material dispersion layer and a porous substrate. A selectively oxygen-permeable substrate can selectively introduce oxygen in the air and have high durability against an electrolytic solution.

20 Claims, 3 Drawing Sheets

SELECTIVELY OXYGEN-PERMEABLE SUBSTRATE, METAL-AIR BATTERY POSITIVE ELECTRODE AND METAL-AIR BATTERY

BACKGROUND OF THE INVENTION AND RELATED ART STATEMENT

The present invention relates to a selectively oxygen-permeable substrate, a metal-air battery positive electrode, and a metal-air battery. More specifically, the present invention relates to a selectively oxygen-permeable substrate capable of selectively introducing oxygen in the air into the inside and having high durability against an electrolytic solution. In addition, the present invention relates to a metal-air battery positive electrode provided with the selectively oxygen-permeable substrate and to a metal-air battery provided with the metal-air battery positive electrode.

Since the metal-air battery employs metal as the negative-electrode active material and oxygen as the positive-electrode active material, the battery has extremely large discharge capacity per "unit mass of the positive-electrode active material". In recent years, increased capacity and increased output of the battery have been required in electric automobiles, portable appliances, and the like, and improvement in performance of the metal-air batteries is expected.

As described above, since the positive-electrode active material of a metal-air battery is oxygen, it is possible to use oxygen in the air as the positive-electrode active material. However, when the air is introduced into the metal-air battery as it is, also carbon dioxide in the air is introduced. Since carbon dioxide reacts with an electrolytic solution used in the metal-air battery, and battery performance may be deteriorated, it is preferable to inhibit carbon dioxide from being introduced into the metal-air battery. Thus, in the case of using oxygen in the air as the positive electrode for a metal-air battery, there has been a problem that carbon dioxide is also supplied to the metal-air battery though it is preferable to inhibit carbon dioxide from being introduced into the positive electrode of the metal-air battery.

In order to solve such a problem, there is investigated a method of removing carbon dioxide from the air supplied to a metal-air battery (see, e.g., JP-A-10-99629).

On the other hand, there is investigated a selectively oxygen-permeable membrane (oxygen enrichment membrane) capable of concentrating oxygen in the air and having magnetic particles dispersed therein (see, e.g., JP-2007-237138).

In the metal-air battery described in JP-A-10-99629, a gas separator provided with a ferrite magnet and a stainless steel is used as a device for selectively permeating oxygen. Therefore, it is imagined that the entire metal-air battery has a large volume and mass.

The oxygen enrichment membrane described in JP-A-2007-237138 is a silicone based membrane. In an organic polymer membrane of silicone or the like, since gas permeation is performed by a dissolution diffusion mechanism derived from a flexible molecular chain, dissolution of carbon dioxide in the membrane cannot be inhibited. Therefore, if a silicone based membrane is used as an oxygen concentration membrane upon using oxygen in the air as the positive-electrode active material of a metal-air battery, it is imagined that sufficient oxygen concentration cannot be performed due to dissolution of carbon dioxide in the membrane. It is also imagined that a silicone based membrane does not have sufficient durability against an electrolytic solution used in the metal-air battery.

SUMMARY OF THE INVENTION

The present invention has been made in view of the aforementioned problem. That is, the present invention aims at providing a selectively oxygen-permeable substrate capable of selectively introducing oxygen in the air into the inside thereof and having high durability against an electrolytic solution. Further, the present invention aims at providing a metal-air battery positive electrode provided with the selectively oxygen-permeable substrate and a metal-air battery provided with the metal-air battery positive electrode.

According to a first aspect of the present invention, a selectively oxygen-permeable substrate is provided, the selectively oxygen-permeable substrate having a magnetic material dispersion layer having carbon as a main component and a magnetic material dispersed therein, wherein the magnetic material dispersion layer has a gas introduction face for introducing gas into the inside thereof.

According to a second aspect of the present invention, the selectively oxygen-permeable substrate according to the first aspect is provided, wherein the magnetic material dispersion layer is a layer where a magnetic material is dispersed in a porous carbon membrane.

According to a third aspect of the present invention, the selectively oxygen-permeable substrate according to the first or second aspect is provided, which has the magnetic material dispersion layer and a porous substrate.

According to a fourth aspect of the present invention, a metal-air battery positive electrode provided with the selectively oxygen-permeable substrate according to any one of the first through third aspects of the present invention.

According to a fifth aspect of the present invention, the metal-air battery positive electrode according to the fourth aspect is provided, which is further provided with a metal-air battery catalyst loaded on the selectively oxygen-permeable substrate.

According to a sixth aspect of the present invention, a metal-air battery is provided, the metal-air battery comprising: a negative electrode employing metal as a negative-electrode active material, and an electrolytic solution present between the positive electrode and the negative electrode, wherein the positive electrode is the metal-air battery positive electrode according to the fourth or fifth aspect is provided.

According to a selectively oxygen-permeable substrate of the present invention, since it has a "magnetic material dispersion layer having carbon as a main component and a magnetic material dispersed therein", oxygen, which is paramagnetic, can selectively be introduced (taken) into the selectively oxygen-permeable substrate by the influence of a magnetic field formed by the magnetic material. On the other hand, molecules of carbon dioxide, water, and the like, which are not paramagnetic, can be eliminated. In addition, the magnetic material dispersion layer contains carbon as the main component, and carbon has a rigid molecular structure and high durability against acid and alkali. Therefore, when the selectively oxygen-permeable substrate is used for a metal-air battery positive electrode, the metal-air battery positive electrode has high durability against the electrolytic solution.

According to a metal-air battery positive electrode of the present invention, since a selectively oxygen-permeable substrate of the present invention is provided, oxygen in the air can selectively be introduced into the metal-air battery positive electrode (selectively oxygen-permeable substrate). In addition, since a metal-air battery positive electrode of the present invention is provided with the aforementioned selectively oxygen-permeable substrate of the present invention, it has high durability against an electrolytic solution.

According to a metal-air battery of the present invention, since the aforementioned metal-air battery positive electrode of the present invention is used as the positive electrode, oxygen in the air can selectively introduced into the metal-air battery positive electrode (selectively oxygen-permeable substrate). In addition, since a metal-air battery of the present invention employs the aforementioned metal-air battery positive electrode of the present invention as the positive electrode, it has high durability against an electrolytic solution.

Figure 1:
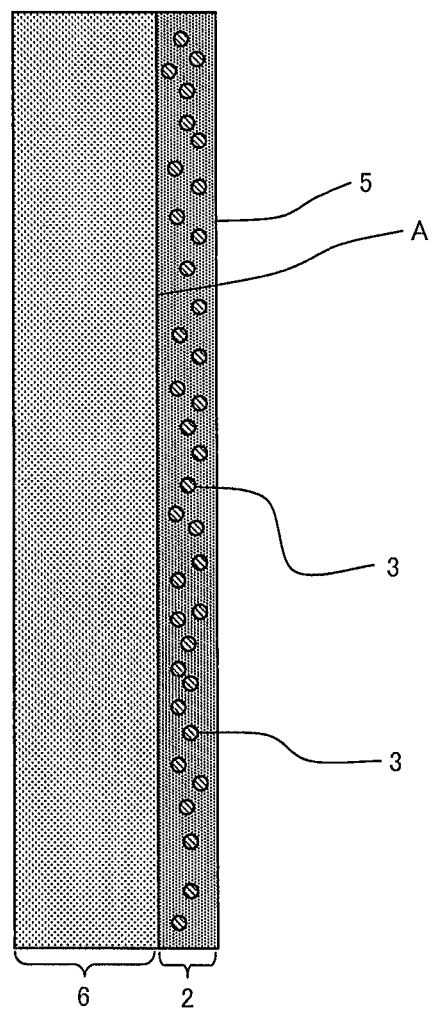
FIG. 1 is a schematic view showing a cross section of an embodiment of a selectively oxygen-permeable substrate of the present invention.

REFERENCE NUMERALS 1, 21: selectively oxygen-permeable substrate, 2: magnetic material dispersion layer, 3: magnetic material, 5: gas introduction face, 6: porous substrate, 10: metal-air battery positive electrode, 11: positive electrode, 11a: air introduction face, 11b: electrolytic solution introduction face, 12: negative electrode, 13: electrolytic solution, 14: metal-air battery container, 15: current collector, 16: protector, 100: metal-air battery, A: bonded face

DETAILED DESCRIPTION OF THE INVENTION

Hereinbelow, embodiments of the present invention will be described specifically with referring to drawings. However, the present invention is by no means limited to the following embodiments. It should be understood that embodiments where changes, improvements, and the like are added to the following embodiments on the basis of knowledge of a person of ordinary skill in the art without deviating from the gist of the present invention are included in the scope of the present invention.

(1) Selectively Oxygen-Permeable Substrate:

As shown in FIG. 1, an embodiment of a selectively oxygen-permeable substrate of the present invention has a magnetic material dispersion layer 2 containing carbon as the main component and a magnetic material 3 dispersed therein. The magnetic material dispersion layer 2 has a gas introduction face 5 for introducing gas into the inside. FIG. 1 is a schematic view showing a cross section of an embodiment of a selectively oxygen-permeable substrate of the present invention.

Thus, the selectively oxygen-permeable substrate of the present embodiment has a "magnetic material dispersion layer containing carbon as the main component and a magnetic material dispersed therein". Therefore, oxygen, which is paramagnetic, can selectively be introduced (taken) into the selectively oxygen-permeable substrate by the influence of a magnetic field formed by a magnetic material. At this time, oxygen is taken into the selectively oxygen-permeable substrate from the gas introduction face. In addition, since the magnetic material dispersion layer contains carbon as the main component, when the selectively oxygen-permeable substrate of the present embodiment is used for a metal-air battery positive electrode, the metal-air battery positive electrode has high durability against the electrolytic solution. Also, in the case that the selectively oxygen-permeable substrate of the present embodiment is used for a fuel cell positive electrode, a similar effect can be obtained.

As shown in FIG. 1, in the selectively oxygen-permeable substrate 1 of the present embodiment, a "porous carbon membrane where a magnetic material is dispersed" (magnetic material dispersion layer 2) is disposed on the porous substrate 6. Therefore, the magnetic material dispersion layer is also porous. The selectively oxygen-permeable substrate 1 is constituted of the magnetic material dispersion layer 2 and the porous substrate 6. Therefore, the entire selectively oxygen-permeable substrate 1 is porous. Incidentally, "porous" means that at least oxygen can pass through it. Though the magnetic material dispersion layer 2 is a layer where a magnetic material is dispersed in a porous carbon membrane, the layer may have other elements. Though the selectively oxygen-permeable substrate 1 has the magnetic material dispersion layer 2 and the porous substrate 6, the substrate 1 may have other elements.

In the selectively oxygen-permeable substrate 1 of the present embodiment, oxygen in the air is introduced (taken) from the gas introduction face 5 of the magnetic material dispersion layer 2 into the inside thereof. The oxygen introduced into the magnetic material dispersion layer 2 passes through the magnetic material dispersion layer 2 and is transferred into the porous substrate 6. Therefore, when the selectively oxygen-permeable substrate 1 of the present embodiment is used as a substrate (component) of a metal-air battery positive electrode, oxygen in the air can efficiently be supplied to the positive electrode of the metal-air battery. In this case, positive electrode reaction (e.g., reaction of lithium ion and oxygen) is caused in the porous substrate 6.

The magnetic material dispersion layer 2 contains carbon as the main component. Here, "contains carbon as the main component" means that the carbon content in the components excluding the magnetic material is 50 mass % or more. As the components other than carbon, there may be contained oxygen, nitrogen, hydrogen, metal elements, and the like. The magnetic material dispersion layer 2 contains carbon as the main component. Therefore, when the selectively oxygen-permeable substrate 1 of the present embodiment is used as a component of a metal-air battery positive electrode, the metal-air battery positive electrode can be inhibited from being deteriorated by the electrolytic solution.

Though there is no particular limitation on the shape of the magnetic material dispersion layer 2, the shape is preferably, for example, plate-like, membrane-like, sheet-like, film-like, stick-like, tube-like, or monolith-like. When the magnetic material dispersion layer 2 has a plate-like shape, the gas introduction face 5 is preferably one of "a pair of faces parallel to each other (front face and back face)" (for example, in the case that the "plate" is a rectangular parallelepiped, a pair of faces parallel to each other) having a largest area in the "plate". When the magnetic material dispersion layer 2 has a membrane-like, sheet-like, or film-like shape, the gas introduction face 5 is preferably one of the faces (one of a pair of faces parallel to each other (front face and back face)) in the "membrane, sheet, or film".

The thickness of the magnetic material dispersion layer 2 (distance from the gas introduction face 5 to the other face parallel to the gas introduction face 5) is preferably 0.1 to 1000 µm, more preferably 0.5 to 100 µm. When it is smaller than 0.1 since a defect such as a pin hole may be caused, an effect of selectively taking oxygen may be lowered. When it is larger than 1000 µm, it may become difficult for oxygen to be transferred to the porous substrate 6. In addition, there is no particular limitation on the area of the gas introduction face 5, and it can appropriately be determined according to the use.

The average pore size of the magnetic material dispersion layer 2 (porous carbon membrane) is preferably 0.3 to 5 nm, more preferably 0.4 to 1 nm. When it is smaller than 0.3 nm, since the pore size is close to the oxygen molecular diameter, oxygen-taking rate may be lowered. When it is larger than 5 nm, since the size is sufficiently larger than the oxygen molecular diameter, the effect of selectively taking oxygen may be lowered.

The magnetic material 3 contained in the magnetic material dispersion layer 2 of the present invention means magnetized ferromagnetic material or ferrimagnetic material. There is no particular limitation on the kind of the magnetic material as long as it has spontaneous magnetization even without an external magnetic field. Examples of the magnetic material include iron oxide, metal iron, alloy containing iron, rare-earth magnet, ferrite based magnet, and magnetite. The magnetic material is preferably magnetic material particles. The magnetic material particles have an average particle diameter of preferably 0.01 to 10 µm, more preferably 0.1 to 5 µm. When it is smaller than 0.01 µm, magnetic force of the magnetic material may be insufficient. When it is larger than 10 µm, the mechanical strength of the magnetic material dispersion layer 2 may be lowered.

It is preferable that the magnetic material 3 is uniformly dispersed in the magnetic material dispersion layer 2. Though the content of the magnetic material 3 contained in the magnetic material dispersion layer 2 is preferably 1 to 90 mass %, the content may appropriately be adjusted in accordance with the intensity of the magnetic force of the magnetic material. When it is smaller than 1 mass %, the effect in selectively taking oxygen may be lowered. When it is larger than 90 mass %, the mechanical strength of the magnetic material dispersion layer 2 may be lowered.

In the selectively oxygen-permeable substrate 1 of the present embodiment, the material for the porous substrate 6 is preferably at least one kind selected from the group consisting of ceramics, inorganic oxides, inorganic nitrides, inorganic carbides, glass, carbon, and metals. As the ceramic, silica, titania, alumina, or zirconia is preferable. As the metal, stainless steel or noble metal is preferable. By employing at least one kind selected from the group consisting of ceramics, inorganic oxides, inorganic nitrides, inorganic carbides, glass, carbon, and metals as the material, in the case of using the selectively oxygen-permeable substrate 1 of the present embodiment as a component of a metal-air battery positive electrode, the metal-air battery positive electrode can be inhibited from being deteriorated by the electrolytic solution. When the material for the porous substrate 6 is carbon or metal, the porous substrate 6 becomes conductive. Therefore, in the case of using the selectively oxygen-permeable substrate 1 of the present embodiment as a component of a metal-air battery positive electrode, the conductivity of the positive electrode is secured. When the selectively oxygen-permeable substrate 1 of the present embodiment is used as a component of a metal-air battery positive electrode with using ceramic as the material for the porous substrate 6, a conductive member may be incorporated into the ceramic in order to secure conductivity of the positive electrode.

It is preferable that the porous substrate 6 is disposed (laminated) on the surface parallel to the gas introduction face 5 (face located on the back side of the gas introduction face 5) of the magnetic material dispersion layer 2.

Though there is no particular limitation on the shape of the porous substrate 6, it is preferably, for example, plate-like, membrane-like, sheet-like, film-like, stick-like, tube-like, or monolith-like.

The thickness of the porous substrate 6 is preferably 0.1 to 500 more preferably 1 to 100 µm, particularly preferably 2 to 50 µm. When it is smaller than 0.1 µm, in the case of using the oxygen selectively permeable substrate 1 of the present embodiment as a component of a metal-air battery positive electrode, the discharge capacity of the metal-air battery may be lowered. When it is larger than 500 µm, it may make difficult the supply of the oxygen passing through the magnetic material dispersion layer 2 and being introduced into the porous substrate 6 to the entire porous substrate 6. Incidentally, the "thickness of the porous substrate 6" means the distance from the face bonded to the magnetic material dispersion layer 2 (sometimes referred to as the "bonded face A") to the face located on the back side of the "bonded face A". There is no particular limitation on the area of the aforementioned "bonded face A" of the porous substrate 6, and it can appropriately be determined in accordance with the use.

The oxygen selectively permeable substrate of the present embodiment may further have a water-repellent layer (not illustrated). When the selectively oxygen-permeable substrate of the present embodiment has a water-repellent layer, water can be inhibited from entering the inside and leaking outside. This enables to inhibit the metal-air battery positive electrode from being influenced by water when the selectively oxygen-permeable substrate of the present embodiment is used as the substrate (component) of a metal-air battery positive electrode.

The material for the water-repellent layer is preferably fluororesin or the like. The water repellent layer may be disposed on the gas introduction face side of the porous substrate (magnetic material dispersion layer) or between the magnetic material dispersion layer and the porous substrate. When the water-repellent layer is disposed on the gas introduction face side of the magnetic material dispersion layer, the gas introduction face is not exposed to the outside. Incidentally, the gas introduction face may be exposed to the outside or may be unexposed to the outside. The shape of the water-repellent layer is preferably plate-like, membrane-like, sheet-like, film-like, or stick-like. There is no particular limitation on the thickness of the water-repellent layer as long as the permeation of water can be inhibited.

Figure 2:
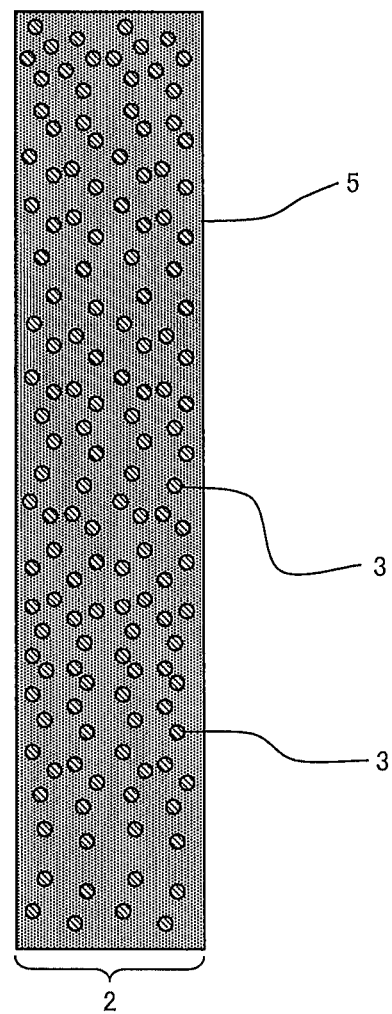
FIG. 2 is a schematic view showing a cross section of another embodiment of a selectively oxygen-permeable substrate of the present invention.

As shown in FIG. 2, in an oxygen selectively permeable substrate of the present invention, the entire selectively oxygen-permeable substrate may contain carbon as the main component, and the entire selectively oxygen-permeable substrate may be a magnetic material dispersion layer 2. FIG. 2 is a schematic view showing a cross section of another embodiment (selectively oxygen-permeable substrate 21) of a selectively oxygen-permeable substrate of the present invention.

Thus, in the selectively oxygen-permeable substrate 21 of the present embodiment, the entire selectively oxygen-permeable substrate contains carbon as the main component. Therefore, the entire selectively oxygen-permeable substrate 21 is conductive, and no conductive member or the like is necessary when the selectively oxygen-permeable substrate 21 is used as a metal-air battery positive electrode. Since carbon can function as a catalyst for a metal-air battery by selecting a structure, it is possible to reduce the catalyst load amount when the selectively oxygen-permeable substrate 21 is used as a metal-air battery positive electrode. Further, a catalyst layer of manganese dioxide or the like may be provided as necessary.

In the selectively oxygen-permeable substrate 21 of the present embodiment, since the magnetic material 3 is disposed in the entire selectively oxygen-permeable substrate, the effect in selectively taking oxygen can be enhanced.

The entire selectively oxygen-permeable substrate 21 of the present embodiment contains carbon as the main component and serves as the magnetic material dispersion layer 2 (The magnetic material 3 is dispersed in the entire selectively oxygen-permeable substrate.). Except for this matter, the selectively oxygen-permeable substrate 21 of the present embodiment is preferably the same as the aforementioned selectively oxygen-permeable substrate 1 as an embodiment of the present invention.

(2) Production Method of Selectively Oxygen-Permeable Substrate:

Next, a method for producing an embodiment (selectively oxygen-permeable substrate 1 (see FIG. 1) of a selectively oxygen-permeable substrate of the present invention will be described.

It is preferable that the selectively oxygen-permeable substrate of the present embodiment is produced by producing a porous substrate in the first place and then disposing a magnetic material dispersion layer on one face of the porous substrate.

(2-1)

Though there is no particular limitation on the method for producing the porous substrate, for example, the following method is preferable.

When the material for the porous substrate 6 is ceramic, in the first place, a forming raw material containing a powdered ceramic raw material is prepared.

As the ceramic raw material, preferred are the materials mentioned as preferable materials for the porous substrate in the aforementioned one embodiment of a selectively oxygen-permeable substrate of the present invention. It is preferable to prepare a slurried forming raw material by mixing a binder, a pore former, a plasticizer, a dispersant, a dispersion medium, and the like as necessary with the ceramic raw material. Next, the slurried forming raw material is formed into a sheet shape to form a green sheet for a porous substrate. It is preferable that the green sheet is dried, degreased, and then fired to obtain a porous substrate. Alternatively, it is also possible that a ceramic powder raw material is formed into a block shape with a die or the like, sintered in an electric furnace or the like, and then cutting the sintered block to obtain a sheet-shaped porous substrate.

When the material for the porous substrate 6 is carbon, there is prepared, for example, a powdered or fibrous carbon raw material (e.g., amorphous carbon, graphite, carbon nanotube, fullerene, and mesoporous carbon). It is preferable to prepare a slurried forming raw material by mixing a binder, a pore former, a plasticizer, a dispersant, a dispersion medium, and the like as necessary to the carbon raw material. It is preferable that the slurried forming raw material is next formed into a sheet shape to form a porous substrate. Alternatively, it is also preferable that the polymer raw material formed into a sheet shape is subjected to a carbonization treatment to obtain a porous substrate as another production method. Alternatively, a sheet-shaped porous substrate can be obtained by carbonizing a block-shaped resin of polyimide resin, phenol resin, or the like, and then cutting the carbonized block to obtain a sheet-shaped porous substrate.

When the material for the porous substrate 6 is metal, it is preferable to obtain the porous substrate by, for example, forming a powdered or fibrous metal raw material into a sheet shape and then sintering the sheet-shaped material. Alternatively, it is preferable that a resin balloon is subjected to a metal-plating treatment and a heating treatment to obtain a porous substrate as another production method. As still another production method, it is also preferable that a fibrous metal raw material is formed into a mesh shape to obtain a porous substrate. Alternatively, a sheet-shaped porous substrate can be obtained by forming a metal powder into a block shape with a die or the like, sintering the block in an electric furnace or the like, and then cutting the sintered block into a sheet shape. Alternatively, a porous substrate can be obtained by anode oxidation of aluminum or the like.

Each condition in the production process can appropriately be determined so that a desired porous substrate can be obtained.

(2-2)

Methods for disposing a magnetic material dispersion layer on one face of the porous substrate are as follows.

Next, a magnetic material dispersion layer is laminated on the porous substrate to produce a selectively oxygen-permeable substrate. For example, a polymer material functioning as a raw material for porous carbon membrane and magnetic material particles are mixed together in a solvent to prepare a precursor solution. Then, it is preferable that the porous substrate is coated with the precursor solution by a method of dip coating, spin coating, drip coating, spray coating, filtration coating, or the like to obtain a coated body. Next, it is preferable that the coated body is dried and then subjected to a thermal treatment in a vacuum or an inert atmosphere for a carbonization treatment to obtain an oxygen selectively permeable substrate. The magnetic material may be magnetized in advance before use or may be magnetized after the selectively oxygen-permeable substrate is obtained.

(2-3)

A method for producing the selectively oxygen-permeable substrate 21 of the present invention shown in FIG. 2 is as follows.

For example, in the first place, a polymer material functioning as a raw material for porous carbon membrane and magnetic material particles are mixed together in a solvent to prepare a precursor solution. Then, it is preferable that the precursor solution is cast on the Teflon (registered trademark) plate or the like to obtain a sheet-shaped formed body. Next, the sheet-shaped formed body is dried and peeled from the Teflon (registered trademark) plate or the like. Then, it is preferable that the dried sheet-shaped formed body is subjected to a thermal treatment in a vacuum or an inert atmosphere for a carbonization treatment to obtain a selectively oxygen-permeable substrate. Alternatively, a sheet-shaped porous substrate can be obtained by dispersing a magnetic material powder in a varnish-like polyimide resin, phenol resin, or the like, solidifying it into a block shape, being subjected to a carbonization treatment, and cutting the block. The magnetic material may be magnetized in advance before use or may be magnetized after the selectively oxygen-permeable substrate is obtained.

(3) Metal-Air Battery Positive Electrode:

An embodiment of a metal-air battery positive electrode of the present invention is provided with a selectively oxygen-permeable substrate 1 of an embodiment of a selectively oxygen-permeable substrate of the present invention (see FIG. 1). In addition, it is preferable that the metal-air battery positive electrode of the present embodiment (see FIG. 3) is further provided with a metal-air battery catalyst loaded on the selectively oxygen-permeable substrate.

The metal-air battery positive electrode of the present embodiment is provided with an embodiment (selectively oxygen-permeable substrate 1 (see FIG. 1)) of a selectively oxygen-permeable substrate of the present invention. Therefore, the metal-air battery positive electrode of the present embodiment can selectively introduce oxygen in the air into the metal-air battery positive electrode (into the selectively oxygen-permeable substrate). In addition, since a metal-air battery positive electrode of the present invention is provided with the aforementioned selectively oxygen-permeable substrate of the present invention, it has high durability against an electrolytic solution.

It is preferable that the metal-air battery catalyst is loaded on the porous substrate. In addition, it may further be loaded on the magnetic material dispersion layer.

As the metal-air battery catalyst, there may be used a compound containing manganese, Au, $Co_3O_4$, NiO, $Fe_2O_3$, Pt, Pd, $RuO_2$, CuO, $V_2O_5$, $MoO_3$, $Y_2O_3$, or carbon. Of these, a compound containing manganese is particularly preferable, and a manganese oxide is furthermore preferable. Examples of the manganese oxide include manganese dioxides ($\alpha$-$MnO_2$, $\beta$-$MnO_2$, etc.).

A conductive member may be disposed on the metal-air battery positive electrode of the present embodiment in order to have good conductivity. As the conductive member, a member made of carbon or metal can be used.

Figure 3:
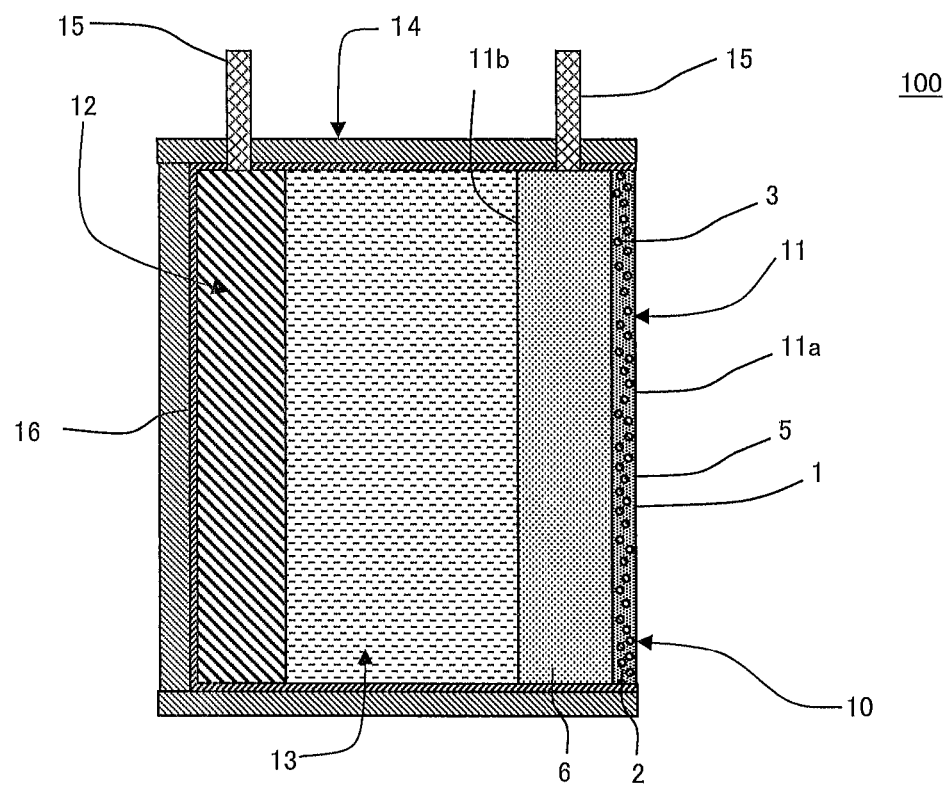
FIG. 3 is a schematic view showing a cross section of an embodiment of a metal-air battery of the present invention.

(4) Metal-Air Battery:

As shown in FIG. 3, one embodiment of a metal-air battery of the present invention is provided with a negative electrode 12 having metal lithium as the negative-electrode active material and an electrolytic solution 13 present between the positive electrode 11 and the negative electrode 12. In the metal-air battery 100 of the present embodiment, the positive electrode 11 is a metal-air battery positive electrode 10 of the present invention. FIG. 3 is a schematic view showing a cross section of one embodiment (metal-air battery 100) of a metal-air battery of the present invention.

Since the metal-air battery of the present embodiment uses an embodiment of a metal-air battery positive electrode of the present invention as the positive electrode, oxygen in the air can selectively be introduced into the metal-air battery positive electrode (into the selectively oxygen-permeable substrate). In addition, since a metal-air battery of the present invention uses the aforementioned metal-air battery positive electrode of the present invention as the positive electrode, it has high durability against the electrolytic solution.

As shown in FIG. 3, in the metal-air battery 100 of the present embodiment, it is preferable that the positive electrode 11 is disposed in such a manner that one face (electrolytic solution introduction face 11b) is brought into contact with the electrolytic solution 13 and that the other face (air introduction face 11a) is bought into contact with the air. Incidentally, in the case that a water-repellent layer is disposed on the surface of the air introduction face 11a, it is preferable that the water-repellent layer is disposed in such a manner that the surface of the water-repellent layer is brought into contact with the air. Here, the gas introduction face 5 of the magnetic material dispersion layer of the selectively oxygen-permeable substrate serves as the air introduction face 11a of the positive electrode of the metal-air battery. In addition, it is preferable that, for example, when the shape of the positive electrode 11 is plate-like, membrane-like, sheet-like, film-like, or the like, "one face" and "the other face" of the positive electrode 11 are "the front face" and "the back face" of the plate, membrane, sheet, film, or the like.

In the metal-air battery 100 of the present embodiment, the electrolytic solution 13 is preferably a non-aqueous electrolytic solution, an aqueous electrolytic solution, or a combination of both the solutions (They are not mixed, and a plurality of layers are formed by means of a separator or the like.). As the electrolytic solution, a known electrolytic solution can be used.

In the metal-air battery 100 of the present embodiment, a separator may be provided between the positive electrode and the negative electrode (not illustrated). There is no particular limitation on the separator as long as the material can withstand use of the metal-air battery.

As shown in FIG. 3, in the metal-air battery 100 of the present embodiment, the positive electrode 11, the negative electrode 12, and the electrolytic solution 13 are housed in the protection body 16, and it is further disposed in the metal-air battery container (casing) 14. The protection body 16 for directly housing the battery structure constituted of a positive electrode, a negative electrode, an electrolytic solution, and the like is preferably insulated by a material having no conductivity. The protection body 16 can have a desired shape. As shown in FIG. 3, the protection body 16 preferably has a shape where the periphery of the positive electrode 11, the negative electrode 12, and the electrolytic solution 13 is isolated (sealed airtightly); insulation of each of them is secured; and the external air (air) is supplied to the air introduction face 11a of the positive electrode 11. For example, as shown in FIG. 3, a shape where the air introduction face 11a of the positive electrode 11 can be exposed to the outside is preferable. It is preferable that the metal-air battery container (casing) 14 disposed so as to impart further mechanical strength to the protection body 16 and protect the protection body 16 from water employs a rigid material such as metal. The thickness of the metal-air battery container 14 can appropriately be determined in accordance with the size and the like of the metal-air battery. In addition, in the metal-air battery 100 of the present embodiment, it is preferable that a current collector 15 is disposed on each of the positive electrode 11 and the negative electrode 12. For example, as shown in FIG. 3, the metal-air battery container 14 preferably has a shape where the air introduction face 11a of the positive electrode 11 is exposed to the outside. However, as long as the air introduction face 11a has a shape where the external air (air) can be supplied thereto, the surface can be protected by a mesh, a plate having holes, or the like.

EXAMPLE

Example 1

A barium ferrite (magnetic material) powder having an average particle diameter of about 1 μm was added to a polyamide acid solution having a polyamide acid concentration of 10 mass % with N-methyl-2-pyrrolidone (NMP) as a solvent to obtain a polyamide acid solution-magnetic material mixture. Then, a polyamide acid solution-magnetic material mixture was stirred for 24 hours to obtain a precursor solution for a membrane. As the polyamide acid solution, U-varnish-A (trade name) produced by Ube Industries, Ltd., was used. The addition amount of the barium ferrite powder was 5 mass parts with respect to 100 mass parts of the polyamide acid. The precursor solution obtained above was coated on the porous alumina plate (porous substrate), dried at 150° C. for 60 minutes, and heated at 250° C. for 30 minutes for imidization (A polyimide membrane was obtained.). The steps from the application to the heating were repeated three times. Then, a thermal treatment was performed at 800° C. to carbonize the polyimide membrane obtained above by the imidization. This enabled to obtain a "carbon membrane containing barium ferrite dispersed therein" having a membrane thickness of about 1 μm. A magnetic field of 1 tesla was applied to the carbon membrane obtained above for magnetization so that the magnetic flux direction might become vertical to the porous alumina plate. This enabled to obtain a selectively oxygen-permeable substrate where a selectively oxygen-permeable membrane was disposed on the surface of the porous substrate.

The selectively oxygen-permeable substrate was subjected to a "gas permeation test" by the following method. The results are shown in Table 1.

(Gas Permeation Test)

Dry air was supplied at 100 $cm^3$/min. on one face side of the membrane disposed on the porous substrate. Then, the components of the gas (permeated gas) discharged on the other face side through the membrane were analyzed by the use of a gas chromatography to obtain oxygen concentration of the permeated gas.

TABLE 1

|  | Oxygen concentration (vol %) | Carbon dioxide concentration (vol %) |
|---|---|---|
| Example 1 | 65 | 0.02 |
| Comp. Ex. 1 | 21 | 0.04 |

Comparative Example 1

There was produced a laminate where a carbon membrane was disposed on the surface of the porous substrate in the same manner as in Example 1 except that a precursor solution for a membrane was produced without adding a barium ferrite powder thereto. The thickness of the membrane was 1 μm.

From Table 1, it is understood that a membrane containing a magnetic material functions as a selectively oxygen-permeable membrane. Also, it is understood that a membrane containing no magnetic material does not have a function of selectively permeating oxygen.

INDUSTRIAL APPLICABILITY

A selectively oxygen-permeable substrate of the present invention can suitably be used as a substrate of the positive electrode of a metal-air battery. A metal-air battery of the present invention can suitably be used in industries using a battery, such as an electric automobile industry.

What is claimed is:

1. A selectively oxygen-permeable substrate having a magnetic material dispersion layer having carbon as a main component and a magnetic material dispersed therein,
    wherein the magnetic material dispersion layer has a gas introduction face for introducing gas into the inside thereof, and
    wherein the magnetic material comprises magnetized ferromagnetic or ferrimagnetic particles.

2. The selectively oxygen-permeable substrate according to claim 1, wherein the magnetic material dispersion layer is a layer where a magnetic material is dispersed in a porous carbon membrane.

3. The selectively oxygen-permeable substrate according to claim 1, which has the magnetic material dispersion layer and a porous substrate.

4. The selectively oxygen-permeable substrate according to claim 2, which has the magnetic material dispersion layer and a porous substrate.

5. A metal-air battery positive electrode provided with the selectively oxygen-permeable substrate according to claim 1.

6. A metal-air battery positive electrode provided with the selectively oxygen-permeable substrate according to claim 2.

7. A metal-air battery positive electrode provided with the selectively oxygen-permeable substrate according to claim 3.

8. A metal-air battery positive electrode provided with the selectively oxygen-permeable substrate according to claim 4.

9. The metal-air battery positive electrode according to claim 5, which is further provided with a metal-air battery catalyst loaded on the selectively oxygen-permeable substrate.

10. The metal-air battery positive electrode according to claim 6, which is further provided with a metal-air battery catalyst loaded on the selectively oxygen-permeable substrate.

11. The metal-air battery positive electrode according to claim 7, which is further provided with a metal-air battery catalyst loaded on the selectively oxygen-permeable substrate.

12. The metal-air battery positive electrode according to claim 8, which is further provided with a metal-air battery catalyst loaded on the selectively oxygen-permeable substrate.

13. A metal-air battery comprising:
    a positive electrode,
    a negative electrode employing metal as a negative-electrode active material, and
    an electrolytic solution present between the positive electrode and the negative electrode,
    wherein the positive electrode is the metal-air battery positive electrode according to claim 5.

14. A metal-air battery comprising:
    a positive electrode,
    a negative electrode employing metal as a negative-electrode active material, and
    an electrolytic solution present between the positive electrode and the negative electrode,
    wherein the positive electrode is the metal-air battery positive electrode according to claim 6.

15. A metal-air battery comprising:
    a positive electrode,
    a negative electrode employing metal as a negative-electrode active material, and
    an electrolytic solution present between the positive electrode and the negative electrode,
    wherein the positive electrode is the metal-air battery positive electrode according to claim 7.

16. A metal-air battery comprising:
    a positive electrode,
    a negative electrode employing metal as a negative-electrode active material, and
    an electrolytic solution present between the positive electrode and the negative electrode,
    wherein the positive electrode is the metal-air battery positive electrode according to claim 8.

17. A meta air battery comprising:
    a positive electrode,
    a negative electrode employing metal as a negative-electrode active material, and
    an electrolytic solution present between the positive electrode and the negative electrode,
    wherein the positive electrode is the metal-air battery positive electrode according to claim 9.

18. A metal-air battery comprising:
    a positive electrode,
    a negative electrode employing metal as a negative-electrode active material, and an electrolytic solution present between the positive electrode and the negative electrode,
wherein the positive electrode is the metal-air battery positive electrode according to claim 10.

19. A metal-air battery comprising:
a positive electrode,
a negative electrode employing metal as a negative-electrode active material, and
an electrolytic solution present between the positive electrode and the negative electrode,
wherein the positive electrode is the metal-air battery positive electrode according to claim 11.

20. A metal-air battery comprising:
a positive electrode,
a negative electrode employing metal as a negative-electrode active material, and
an electrolytic solution present between the positive electrode and the negative electrode,
wherein the positive electrode is the metal-air battery positive electrode according to claim 12.

* * * * *